United States Patent [19]

Lapeyre

[11] Patent Number: 4,852,055

[45] Date of Patent: Jul. 25, 1989

[54] FORMING LINES IN COMPUTER AIDED PATTERN GENERATING SYSTEMS

[75] Inventor: James M. Lapeyre, New Orleans, La.

[73] Assignee: The Laitram Corporation, New Orleans, La.

[21] Appl. No.: 93,209

[22] Filed: Sep. 4, 1987

[51] Int. Cl.$^4$ .................. G09G 3/02; G06F 15/606
[52] U.S. Cl. .................. 364/512; 364/521; 340/706; 340/710; 356/152; 356/256
[58] Field of Search ........... 364/512, 518, 521, 520; 340/706-712; 356/1, 140, 141, 152, 256; 178/18

[56] References Cited

U.S. PATENT DOCUMENTS

| | | | |
|---|---|---|---|
| 4,555,699 | 11/1985 | Citron et al. | 340/706 |
| 4,675,665 | 6/1987 | Halliwell | 340/706 |
| 4,677,258 | 6/1987 | Kawashima et al. | 340/710 |
| 4,686,329 | 8/1987 | Joyce | 340/710 |
| 4,688,933 | 8/1987 | Lapeyre | 356/1 |
| 4,698,626 | 10/1987 | Sato et al. | 340/709 |
| 4,712,100 | 12/1987 | Tsunekuni et al. | 340/710 |
| 4,725,829 | 2/1988 | Murphy | 340/709 |
| 4,737,773 | 4/1988 | Kobayishi | 340/706 |
| 4,751,507 | 6/1988 | Hama et al. | 340/709 |

OTHER PUBLICATIONS

Devoke Computer Support Product, informational sales pamphlet, Oct. 1988.

Primary Examiner—Felix D. Gruber
Assistant Examiner—Brian M. Mattson
Attorney, Agent, or Firm—Laurence R. Brown; Alfred J. Mangels

[57] ABSTRACT

Lines of various slopes and positions are generated simply in a computer aided manual drafting system. Such lines may be drawn with a modified puck manually movable over a surface to control the position of a cursor in an electronic computer display, and may be stored for later adoption in a manually directed computer aided drafting step. The puck senses two spaced positions on a surface over which it moves, thereby to define the slope of a line positioned with a datum point at the cursor location positioned by the puck in a conventional manner. Lines in this system are defined by two points in a coordinate system, namely a datum position point and a slope position point. This format affords simplified entry, processing and storage of line data in a computer. Such lines are electronically formulated in a graphical representation on a visual graphical display in response to manual controls, either directly on line from simplified puck manipulation, or from stored line data to be positioned and controlled in a graphical display by puck manipulation. Thus, unique lines are generated by locating a cursor position with the puck to define a line location (datum) and by moving the puck to define another point spaced from the datum point thus defining the slope of the line relative to the cursor position.

12 Claims, 4 Drawing Sheets

FORMING LINES IN COMPUTER AIDED PATTERN GENERATING SYSTEMS

TECHNICAL FIELD

This invention relates to pattern generation in computer aided drafting and design systems, and in particular, it relates to simple and efficient means and methods for manually formulating lines in a manually generated pattern display on a computer screen.

BACKGROUND ART

In the present state of the art in computer aided drafting and design systems, generated patterns are generated by means of manually moving a puck (or mouse) in a desired pattern over a surface corresponding to a coordinate system, such as a planar two dimensional surface for generating corresponding visible two-dimensional patterns on an orthogonal display. Thus, a draftsman manipulates the puck rather than a pencil or pen to generate a pattern, which is stored in and available from the computer system whenever desired. U.S. patents representative of these type of systems are U.S. Pat. No. 3,399,401 to T. O. Ellis et al., Aug. 27, 1968 for "Digital Computer and Graphic Input System"; U.S. Pat. No. 4,543,571 to R. A. Bilbrey et al., Sept. 24, 1985 for "Optomechanical Cursor Positioning Device"; and U.S. Pat. No. 3,643,148 to A. Brown, et al., Feb. 15, 1972 for "Ball Tracker Assembly".

In systems of this type the manual input of information by the manually movable mouse or puck is effected in various ways. Thus, mechanical and electronic position sensors are available. Some complex systems exist that require an optical sensing mouse to distinguish between differently colored grid lines on a surface over which the mouse moves, such as the S. T. Kirsch U.S. Pat. No. 4,364,035, Dec. 14, 1982 for "Electro-optical Mouse" and U.S. Pat. No. 4,546,347, Oct. 8, 1985 for "Detector for Electro-optical Mouse". In these systems, the position sensor may require a multiplicity of up to seven cells for determining a coordinate point on a two-dimensional surface. It is pertinent that a coordinate point may be located by a mouse or puck in this invention for control of a cursor in an associated computer screen, but various known prior art systems and detection schemes may be used with the present invention for achieving the manual control function generally related to a puck or mouse herein for locating specific coordinate points.

Pattern formation by manual manipulation of a puck is pertinent to the present invention. Most patterns involve the generation of lines. Since the draftsman conventionally uses a pencil or pen to draw the lines in place on a pattern being formulated, the puck has heretofore been used in a similar manner by moving over-the-line position in-situ to generate lines with the attendant requirement to devote a considerable amount of time and precision in the manipulation of the puck. Thus, it has been conventional to formulate the lines in-situ in the visual pattern being monitored during pattern construction. If it is desirable to change the location of the line or to change its slope, it requires complex manual manipulation of the puck, generally requiring deletion and redrawing. There has not heretofore been available in the art a computer aided drafting and design system directed explicitly to the efficient and precise formulation and placement of lines.

Furthermore, when a manually generated pattern from the puck movement is processed and stored in the computer system, considerable storage space is required to define the lines. In addition, during the generation of the lines, data processing required to position and generate the lines becomes complex and cumbersome.

It is accordingly an objective of this invention to resolve the foregoing deficiencies of the computer aided drafting and design system art by providing improved line generation systems.

A more specific objective of this invention is to formulate and generate lines positionable in a pattern produced in a computer aided drafting and design system in a simplified manner, and to increase the flexibility, speed and capacity of such computer systems by reducing the processing complexity and storage space devoted to line location and definition.

Another specific objective of this invention is to provide means and methods of manually formulating patterns including lines in a computer aided drafting system with less time and fatigue for the draftsman.

DISCLOSURE OF THE INVENTION

A preferred embodiment of the invention provides in a computer aided drafting and design system a puck positionable on a two-dimensional surface for producing electronically generated visual displays on a computer screen following the manual positioning of the puck. Lines are simply generated by choosing two coordinate positions with the puck to define respectively a datum line position with a first puck coordinate point position sensing step and a second coordinate point position along the desired line to define the slope of the line.

The preferred puck embodiment has two spaced coordinate point sensors, each defining the two-dimensional coordinate point location of that sensor in an orthogonal coordinate array corresponding to the surface upon which the puck is moved. Thus, one puck sensor defines the line position in the coordinate array by a datum point (x,y). The remaining puck sensor defines the slope of the line by specifying a spaced point along the line (x, y).

In this manner a line and its slope is defined in the computer by the two sensed spaced coordinate points, and the puck need not be moved along the line across the surface to define and generate the line. THe two point line definition simplifies computer calculations and storage. The line position datum point corresponds to the cursor position, and thus the line is defined simply by tilting or rotating the two-sensor puck about the datum point to specify the line slope before entry of the two coordinate points defining that particular line.

Further objects, features and advantages of the invention will be found throughout the following description, claims and drawings.

BRIEF DESCRIPTION OF THE DRAWINGS

Throughout the various figures, similar reference characters refer to similar features to facilitate comparison.

THE PREFERRED EMBODIMENTS

Figure 1:
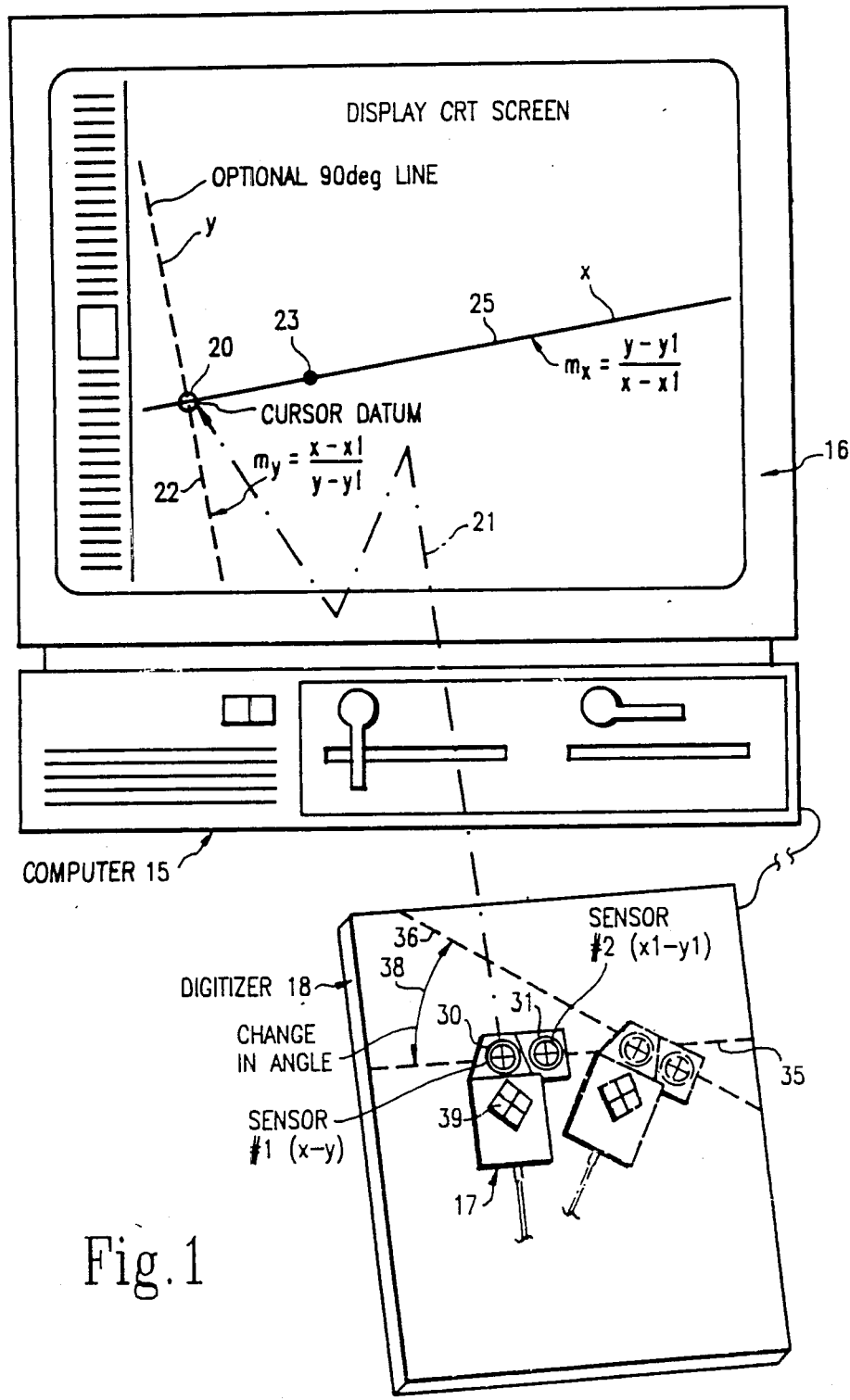
FIG. 1 is a sketch of a computer aided drafting and design system for manual formulation of patterns displayed on the computer screen by movement of a puck over a two-dimensional surface, as afforded by a preferred embodiment of this invention.

With reference to the drawings and in particular to FIG. 1, the computer 15, which could be of the type known as personal computers, having display screen 16 is programmed and constitutes the necessary arrangement of hardware components to function as a computer aided manual drafting and design system with manual input by means of movement of the puck 17 over a two-dimensional surface 18. Thus, control of the cursor position 20 by means of the puck 17 and corresponding computer control circuits results in formulation of a pattern on the screen 16 in a drafting mode of computer operation.

In accordance with this invention, the designation of any unique line, such as 25, at any screen location is simply effected by control of the puck 17, to be a part of any pattern formulated on the screen 16 by the manual movement and control of the puck 17 and cursor 20, which is diagrammatically shown by the phantom line 21. If orthogonal coordinate axes X and Y are to be provided, or otherwise a normal line through the datum point 20 is to be provided, the optional line 22 is generated by computer operation without further puck manipulation.

Each unique line, in accordance with this invention, is defined by a datum point, establishing the line position or location on the screen 16, and by the slope m of the line. This slope is defined in the simplest possible manner by establishing a second point 23 somewhere on the line (25) spaced from the datum point. That is by choosing two points x, y (at the cursor 20) and x, y (at the spaced slope point 23), the definition of any line positioned at any position on the screen is defined. Optionally, the points 20 and 23 may be at the terminal points of a line of limited length, or such lines may be defined by other specifications of the end positions thereon.

With the two point definition of the line, the computer may calculate the line slope and generate the line in-situ through the cursor position 20, as shown for 25. Its slope $m(x) = y - y^1/x - x^1$. Similarly the normally disposed coordinate line Y passing through the datum point is defined by slope $m(y) = x - x^1/y - y^1$. It is readily recognized by those skilled in the art that the calculations are simple and the storage space for both retention of line definitions and for use in calculations of line slope, etc. or for generating the graphical respresentation of the line of the screen 16 are simplified and advantageous.

In this preferred embodiment, lines are efficiently and simply selected by means of puck 17, which has two spaced sensors, 30, 31 each designating a corresponding point (x, y or x, y) on the two-dimensional surface 18, and therefore also the corresponding two points 20, 23 on the computer display screen 16. The cursor position 20 on screen 16 corresponds to a manual selection of the position of sensor 30, and the spaced slope defining point 23 on the line 25 (X) corresponds to the manual positioning of sensor 31 on puck 18.

Accordingly, dotted line 35 is formulated and defined by the puck 17, as shown. To move the line position, illustrated by the puck in phantom lines, the cursor position is moved with the movement of the puck to the datum position of the further dotted line 36, thereby defining a new line position in the pattern on the screen 16. By relatively rotating the puck about the sensor 30, the slope or line angle may be defined, as illustrated by the angle change 38.

It is seen therefore that the line need not be drawn by the draftsman in each instance, as heretofore, but rather may be defined completely by the single act of positioning the pucks two sensors to define the position and slope of a desired line. The puck control buttons 39 may be used to enter the line, to define the cursor point location, and for timing of successive entries on the pattern to be formulated for the screen 16. It is readily recognized that the criticality of following a rule, or tracing a line throughout its length, is eliminated together with the fatigue of the draftsman. All this is achieved together with little equipment change and cost, and with significant advantages in the computer system memory and calculation sections because of the brevity of the line definition.

Figure 2:
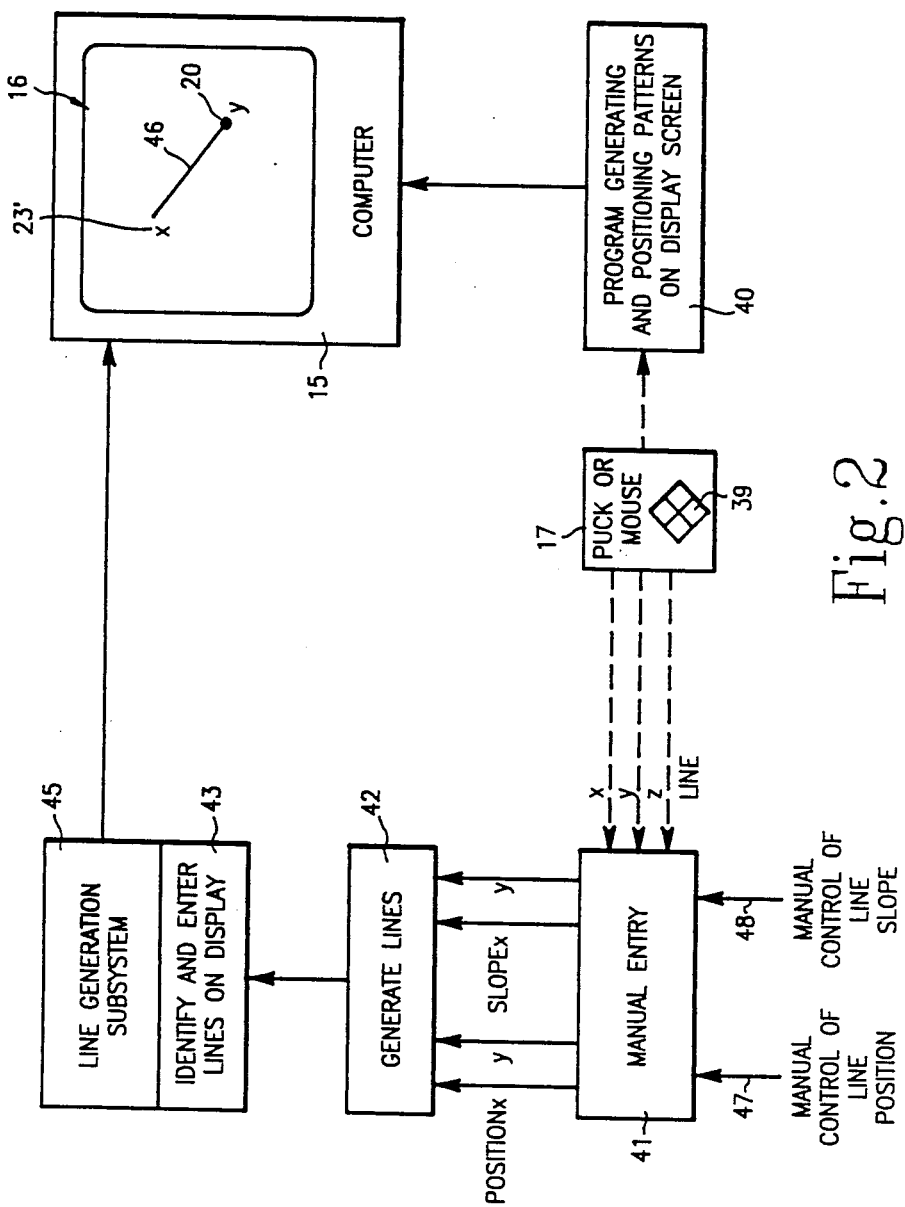
FIG. 2 is a block system outlining interaction between key parts of a computer aided drafting and design system afforded by this invention.

FIG. 2 relates to the foregoing means and method for manually formulating a specified line on the screen 16 of computer 15 by puck 17. The computer 15, which may be a personal computer, is programmed by means 40 to comprise computer aided drafting of a design system capable of generating and positioning patterns on the display screen 16 in response to manual manipulation of the interconnected puck 17.

In accordance with this invention, the puck 17 is capable of producing coordinates x and y of two separated points along a line for entry of a line definition, such as by means of switch buttons 39 on the puck 17. The manual selection and entry for the flow of this data is illustrated by block 41, which shows by legend that each of the points (x,y) designating line position and $(x^1,y^1)$ designating line slope is manually controlled by positioning the puck 17 appropriately on its cooperative two-dimensional surface, not shown. The coordinate system could be three dimensional and polar in nature, if desired without departing from the spirit and nature of this invention.

By appropriate programming of a general purpose computer, for example, calculations and movement of the cursor to generate a defined line and store it for reproduction on the screen 16 in the manner aforesaid is effected at 42. Stored or live lines may be identified and entered on the display screen as desired by means represented in block 43. Thus, manually controlled line generation sub-system 45 for formulating lines on computer screen 16, and in the computer memory, is afforded by this invention to simply and efficiently place any line such as 46 in position on pattern displayed on screen 16. By means of puck 17 and manual line position control 47, the cursor 20 and thus the line position may be moved from position to position on the screen 16.

Similarly with the manual control of the line slope 48, the slope of line 46 may be controlled either by movement of the puck 17 to define and enter the line slope coordinate point, or by programmed computer calculations increasing or decreasing the slope, or alternately by withdrawal from memory of stored lines of predetermined slope. Thereby, this invention provides a completely flexible and comprehensive system for producing lines in connection with a computer aided drafting and design system.

Figure 3:
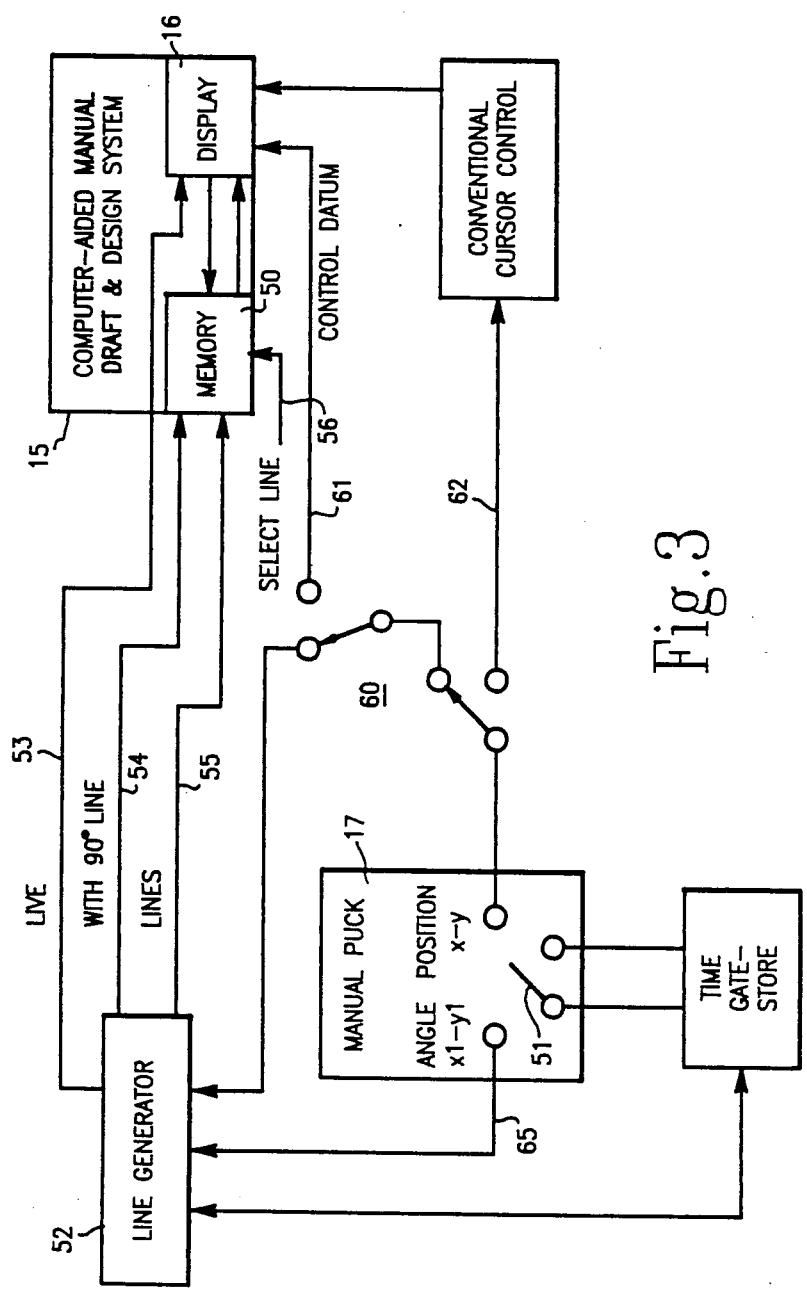
FIG. 3 is a block data flow system diagram of a line generation system embodying the invention.

In FIG. 3, there are diagrammed information flow paths through a system afforded by this invention as set forth in the other views. Thus the computer 15, its display screen 16, and the memory 50 receive information produced from manual manipulation of the puck 17, which as aforesaid identifies by manual manipulation both a line angle point $x^1$, $y^1$ and a line position (datum) point x, y, and permits entry of a defined line by a manually controlled switch selector 51. This switch 51 controls the time at which the points manually selected to define the line are entered into the computer system for processing, storage and line formulation through an appropriate line generator system 52, which by way of example could comprise a program subroutine affording the various selections identified by lines and switches in this view.

Provisions are made for entry of live data 53 in response to manual control of puck 17 for creating lines on the display screen 16. Selection of an optional ninety degree perpendicular line (at the datum point or otherwise) from the same input data is provided as well, 54, either directly for live processing or into memory 50 for future recall or for generation of a displayed pattern, in brief coded format or in a live pattern generating format. Lines are stored 55 or recalled 56 by means of manual control.

Switching means 60 provides for either direct live control of the datum point to move the line about via line 61 or for indirect control after storage and calculation in computer 15. There is also optional provision for conventional cursor control drafting and design generation of patterns by means of line 62 as manipulated by the location of the cursor position x, y. Similarly the angular control of a line is effected as illustrated by line 65.

Figure 4:
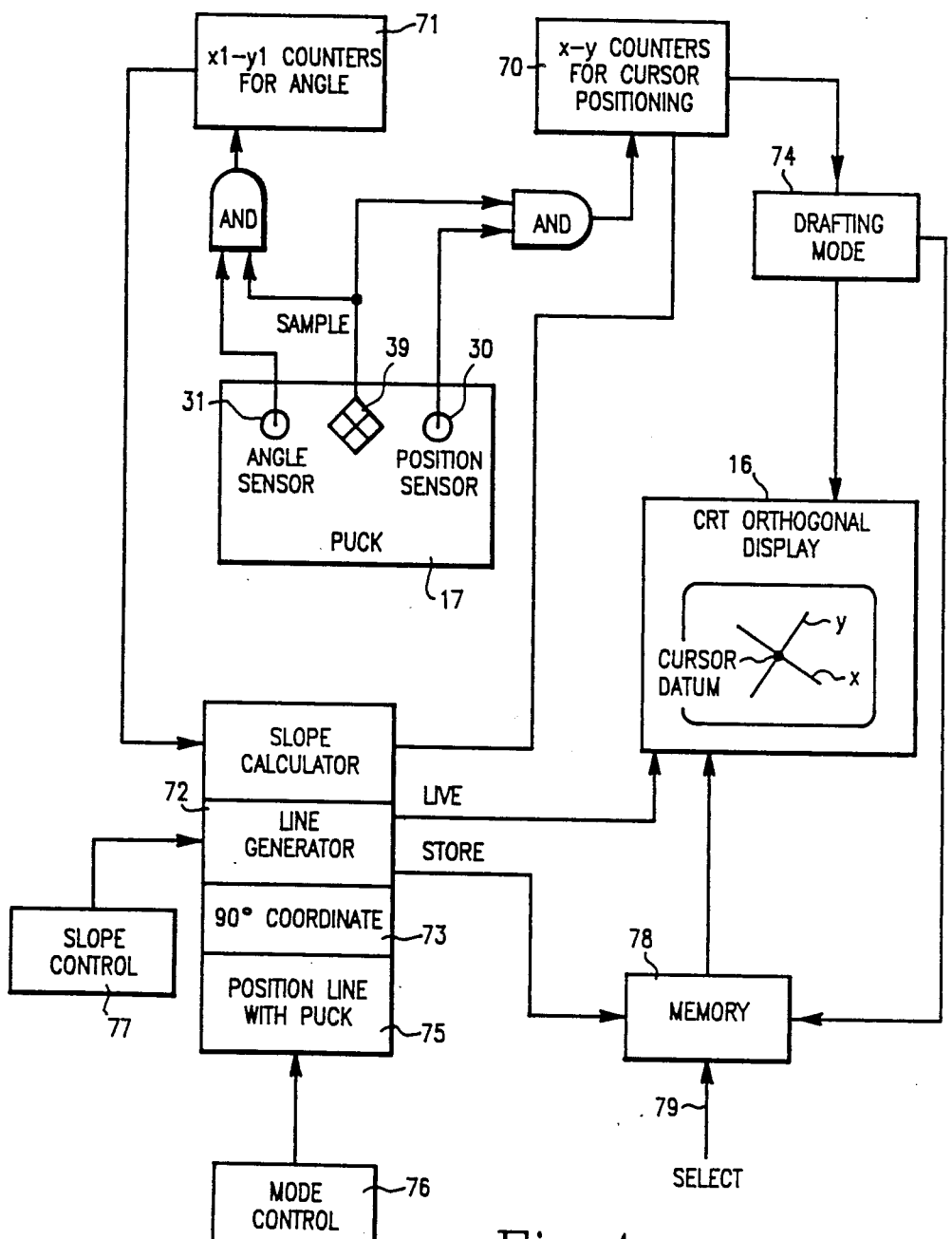
FIG. 4 is a block diagram of a computer system embodying the invention.

Now reference is made to FIG. 4. As illustrated by some of the patents hereinbefore identified, certain aspects of the computer system employed for carrying out the novel methods of line generation afforded by this invention are well known in the art. Thus, the use and programming of x and y coordinate counters 70 are known for positioning the cursor 20 on screen 16 in response to manually manipulated pucks 17 having switches and a two-dimensional coordinate position sensor 30. In a similar manner with $x^1$, $y^1$ counters 71 the line angle point data for identification of the line angle may be processed, and a line may be generated in know fashion from such data, as illustrated at 72. The normal coordinate slope is identified by the same sensed data and is thus available for generation at 73.

In the conventional drafting mode illustrated by block 74, provisions are made for moving bodies, such as lines about the screen 16, as shown by block 75, when the appropriate programmed mode control 76 permits an identified shape to be relocated by means of the puck 17. Similarly, the slope control of a line generated or stored in the system (78) is effected as shown at 77 from the selection of the angle coordinate (31) with the puck 17 with the appropriately programmed computer mode. Selection of stored lines from memory 78 is effected if desired by conventional memory retrieval techniques at 79.

Thus, it is seen that improved and simplified means and methods are provided by this invention for manually designating a line in a computer controlled drafting and design system for incorporation in a manually prepared pattern positioned in a coordinate system produced on a computer display screen. Although the use of multiple sensors on a manually movable puck may have been usable to generate a line or to produce angular rotation data as set forth in the aforesaid known art, there has been no known prior art addressed to the simplification of entry of lines in a computer aided manual pattern producing system known as a drafting and design system, so that two points are manually entered for computer processing and generation of a line on a display system adapted for line storage and recall. A line is drawn manually in a preferred embodiment of this invention with a stationary puck entering two and only two sensed coordinate positions on a two dimensional coordinate system for simple manipulation in the computer calculations, less memory storage requirements, and significant reduction of draftsman's time and fatigue.

Having therefore set forth the invention and its operation to those skilled in the computer arts, novel interacting features of the invention are defined with particularity in the following claims to describe the spirit and scope of the invention, and its resolution of heretofore unsolved problems in the art with corresponding introduction of heretofore unrealized advantages.

I claim:

1. In computer aided apparatus for generating displays and designs by means of a position sensor movable over a two dimensional surface and adapted by switching means thereon to identify a particular location by manual switching of the sensor at a selected position on said surface and means for locating a cursor on a display medium in response to movement of said sensor in a two dimensional pattern over the surface, the improvement comprising in combination, a further angle sensor movable by the position sensor identifying a second location on the surface spaced from said particular location identified by the position sensor, thereby to define two angle defining locations for identifying the slope and location of a line, and means for generating and displaying in response to a line generating command on said display medium a line with a slope and location established by respective said particular and second locations of the two sensors on said surface.

2. The improvement defined by claim 1 further comprising a computer operable with said computer aided apparatus having means for generating upon command a second line intersecting said line generated by the line generating command at ninety degrees at a coordinate determined by said position sensor particular location on the surface.

3. A computer aided line generating system comprising in combination:

manually operable sensing means for identifying and selecting two relatively spaced location points with predetermined spacing distance therebetween, a two-dimensional system for moving the sensing means over a surface for identification of two locations on an orthogonal coordinate system with a pair of location points corresponding to the two relatively spaced location points identified by the sensing means at every sensing means position, and line identification means responsive to selection of a particular set of the two relatively spaced location points identified by the sensing means at a selected sensor position for defining and generating a particular line by position and slope in said orthogonal coordinate system.

4. The computer aided line generating system defined in claim 3 further comprising,
a cathode ray tube system presenting said orthogonal coordinate on a display screen, and means for generating said generated line identified by the two points of the sensing means and positioning it on the display screen in response to two-dimensional movement positioning of the sensing means on said surface.

5. The computer aided line generating system defined in claim 4 further comprising,
a computer operable with said system having means for selectively generating upon command a perpendicular line intersecting the generated line at a datum point established by the position of one of the points identified by the sensing means.

6. A line generated system comprising in combination: manually movable location sensing means positionable on a two-dimensional surface with switching means thereon for identifying thereon two spaced points for defining a particular line position and slope and providing for the two spaced points to be relatively rotationally about each other by movement of the sensing means at various positions on the surface to rotate one of the two points for defining the line slope about the other point defining the line position,
means responsive to only two identified points from the sensing means selected at a designated position on said surface by said switching means for defining a particular line by its position and slope in a coordinate system,
means for storing the coordinates of the two points as a line definition for a selected line, and
means for producing selectively a visible display of the slope and position of said line from the stored line definition.

7. A method of electronic computer assisted manual drafting and design comprising in combination the steps of:
manually defining the slope and position of a line on a coordinate system by moving a puck having a selection switch for activating in unison only two electronic position sensors located on a manually positionable puck having a selection switch for defining for a particular line two corresponding points spaced on a predetermined surface simulating the coordinate system,
electronically calculating and storing information identifying the slope and position of a line from the two points selected at a manually defined position on said surface, and
producing from the stored information a visual graphical representation of the particular identified line.

8. A method of drafting in an electronic computer aided manual drafting and design system, comprising in combination, the steps of:
defining with a manual selection switch to activate two spaced sensors on a manually movable puck movable over a two dimensional surface individual unique lines relative to a predetermined coordinate system with the spaced sensors locating a line datum position and slope,
storing in an electronic memory of the electronic computer by identification of the coordinate positions sensed by said two sensors the definition of at least one particular line for manual selection thereof,
electronically formulating in said computer a visual graphical representation of a particular manually selected line in said coordinate system from the stored definition,
storing in said memory bank data for establishing different line slopes available for manual selection,
selecting manually one of said stored line slopes for formulating said graphical representation of a selected line, and
positioning said graphical representation of said stored line to a datum position in said coordinate system by moving the puck over a surface corresponding to said coordinate system.

9. A method of drafting in an electronic computer aided manual drafting and design system, comprising in combination, the steps of:
defining individual unique lines relative to a predetermined coordinate system by a line datum position and slope,
storing in an electronic memory of the electronic computer the definition of at least one particular line for manual selection thereof,
electronically formulating in said computer a visual graphical representation of a particular manually selected line in said coordinate system from the stored definition,
formulating in real time said graphical representation by means of manually activating a position sensing instrument for defining two spaced points on the line and manually movable over a two dimensional surface to control the position of the line for display on a computer display screen of said datum position and slope.

10. A method of formulating a line in a puck controlled computer system for producing manually generated designs, comprising in combination, the steps of:
establishing a line position in a coordinate system by manually locating a datum point on a surface representative of the coordinate system by movement of a first sensing element on a position sensing puck on that surface,
manually establishing a second point on the surface with a second sensing element spaced from the datum point sensing element on the puck by movement of the position sensing puck on that surface to define with the two sensing elements a slope of the line to be formulated, and
processing in the computer system in response to switch selection means on the puck the two manually located points sensed by the puck to identify and reproduce the formulated line.

11. The method as defined in claim 10 further comprising the step of graphically representing the formulated line in a coordinate system display on a computer display screen.

12. A method of manually designating a line in a computer system operable for drafting and design operations for incorporation in a manually prepared pattern positioned in a coordinate system produced on a computer display screen, comprising in combination the steps of:
manually entering into the computer system with a movable puck having thereon a first datum point sensor and a selection switch for locating a line position in the coordinate system, manually entering into the computer system simultaneously with the datum point from a second sensor on the puck identifying a second point spaced from the datum point and positioned with respect thereto to sense responsive to the selection switch two spaced points thereby to define a slope and datum position of the line, and processing in the computer system the two entered points to generate a line display positioned on the display screen.

* * * * *